United States Patent [19]

Smiley et al.

[11] Patent Number: 5,982,863
[45] Date of Patent: Nov. 9, 1999

[54] COMMUNICATIONS SYSTEM FOR A SERVICE PROVIDER

[75] Inventors: J. Neil Smiley; J. Donald Smiley, both of Dallas, Tex.

[73] Assignee: Phytel, Inc., Dallas, Tex.

[21] Appl. No.: 08/921,998

[22] Filed: Aug. 27, 1997

[51] Int. Cl.[6] .................................................. H04M 15/00
[52] U.S. Cl. ......................... 379/112; 379/114; 379/67.1; 379/88.09; 379/88.18; 379/91.01; 379/100.08; 379/201
[58] Field of Search ................................ 379/67.1, 88.11, 379/91.01, 90.01, 93.03, 93.24, 100.04, 100.06, 100.08, 112, 114, 128, 131, 145, 93.23, 93.14, 88.13, 88.09, 88.25, 144

[56] References Cited

U.S. PATENT DOCUMENTS

| | | | |
|---|---|---|---|
| 4,783,800 | 11/1988 | Levine | 379/88.111 |
| 4,969,136 | 11/1990 | Chanmberlin et al. | 379/93.14 |
| 5,128,981 | 7/1992 | Tsukamoto et al. | 379/67.1 |
| 5,155,761 | 10/1992 | Hammond | 379/67.1 |
| 5,260,986 | 11/1993 | Pershan | 379/67.1 |
| 5,289,531 | 2/1994 | Levine | 379/88.11 |
| 5,495,284 | 2/1996 | Katz | 379/93.21 |
| 5,509,064 | 4/1996 | Weiner et al. | 379/265 |
| 5,519,766 | 5/1996 | Jones | 379/88.09 |
| 5,524,139 | 6/1996 | Jones | 379/88.25 |
| 5,612,869 | 3/1997 | Letzt et al. | 395/203 |
| 5,625,682 | 4/1997 | Gray et al. | 379/266 |
| 5,696,965 | 12/1997 | Dedrick | 379/67.1 |
| 5,719,928 | 2/1998 | Pinnell et al. | 379/202 |
| 5,740,229 | 4/1998 | Hanson et al. | 379/67.1 |
| 5,745,882 | 4/1998 | Bixler et al. | 379/67.1 |
| 5,809,119 | 9/1998 | Tonomura et al. | 379/112 |
| 5,822,416 | 10/1998 | Goodacre et al. | 379/142 |
| 5,835,580 | 11/1998 | Fraser | 379/91.01 |
| 5,848,132 | 12/1998 | Morley et al. | 379/202 |
| 5,872,841 | 2/1999 | King et al. | 379/202 |

*Primary Examiner*—Paul Loomis
*Assistant Examiner*—Rexford N. Barnie
*Attorney, Agent, or Firm*—Haynes and Boone, LLP

[57] ABSTRACT

An integrated, electronic communications system and method for a service provider that provides an intelligent interface between a client, a service provider and a data network and/or a telephone network. The system includes a storage device for storing a schedule of the service provider and an interactive voice response unit ("IVR") for interfacing with the client. The client may call into the IVR and through a series of menus, select an available appointment from the schedule or submit his own appointment. The system then notifies the service provider that an appointment has been established. The system may also provide information about the client to the service provider for use during the appointment. In addition, the system allows the client to leave voice mail messages and/or retrieve messages from the service provider. The system also includes a time measurement device that records a length of time for an interaction between the client and service provider. The interaction may be a telephone appointment, an in-person appointment, or a voice mail transaction. The length of time is then available for such purposes as billing the client for the interaction.

25 Claims, 5 Drawing Sheets

COMMUNICATIONS SYSTEM FOR A SERVICE PROVIDER

TECHNICAL FIELD

This invention relates generally to user and electronic interface systems, and in particular, to the utilization of an integrated, electronic communications system for interfacing a service provider and a client with telephony and data networks.

BACKGROUND OF THE INVENTION

The remote accessability of people and information is continually increasing. A person now has at his disposal many different communication devices, such as a telephone, cellular telephone, pager, facsimile, and e-mail. However, despite the benefits of accessibility, being easily accessible often becomes difficult to manage or even burdensome, especially for service providers. For example, doctors are now readily accessible, such as through a simple telephone call. However, by answering and responding to each such call, a doctor has little time to tend to the patients in his office. Therefore, the doctor must balance the responsibilities of being accessible to callers while still providing prompt and timely service to the patients in his office. One solution to this problem is to have a staff member schedule times that the doctor can call back the patient. But the cost of a staff member to perform this task can be too expensive.

In addition to upsetting his and his patient's schedules, the doctor is typically not reimbursed for the time that he and/or his staff spend on the telephone. Although most patients would not like to be charged for telephone calls, in actuality they are indirectly paying for each call. For example, the doctor is forced to adjust his rates to account for the time taken to handle these calls. Also, the excessive time some patients spend waiting in the doctor's office is directly attributable to such calls. To resolve this dilemma, some doctors have tried to charge callers for receiving calls. However, there are many problems associated with charging for small increments of time. For one, there is no accurate way to track the time for each call that is reliable and accepted by most insurance companies or Medicare. Also, the amount of time for a person to prepare, calculate and bill for the calls negates any benefits from billing.

Therefore, what is needed is a system that allows the doctor to easily and automatically schedule call back times.

Furthermore what is needed is a system that keeps track of telephone time and other small charges and bills patients accordingly.

SUMMARY OF THE INVENTION

In response to such difficulties, a technical advance is achieved by providing an integrated, electronic communications system and method that provides an intelligent interface between a client, a service provider and a data network and/or a telephone network. In one embodiment, the system includes a storage device for storing a schedule of the service provider and an interactive voice response unit ("IVR") for interfacing with the client. The client may call into the IVR and through a series of menus, select an available appointment from the schedule. The system then notifies the service provider that an appointment has been established. The system may also provide information about the client to the service provider for use during the appointment. In addition, the system allows the client to leave voice mail messages and/or retrieve messages from the service provider.

In another embodiment, the system includes a time measurement device that records a length of time for an interaction between the client and service provider. The interaction may be a telephone appointment, an in-person appointment, or a voice mail transaction. The length of time is then available for such purposes as billing the client for the interaction.

DESCRIPTION OF THE PREFERRED EMBODIMENT

Figure 1:
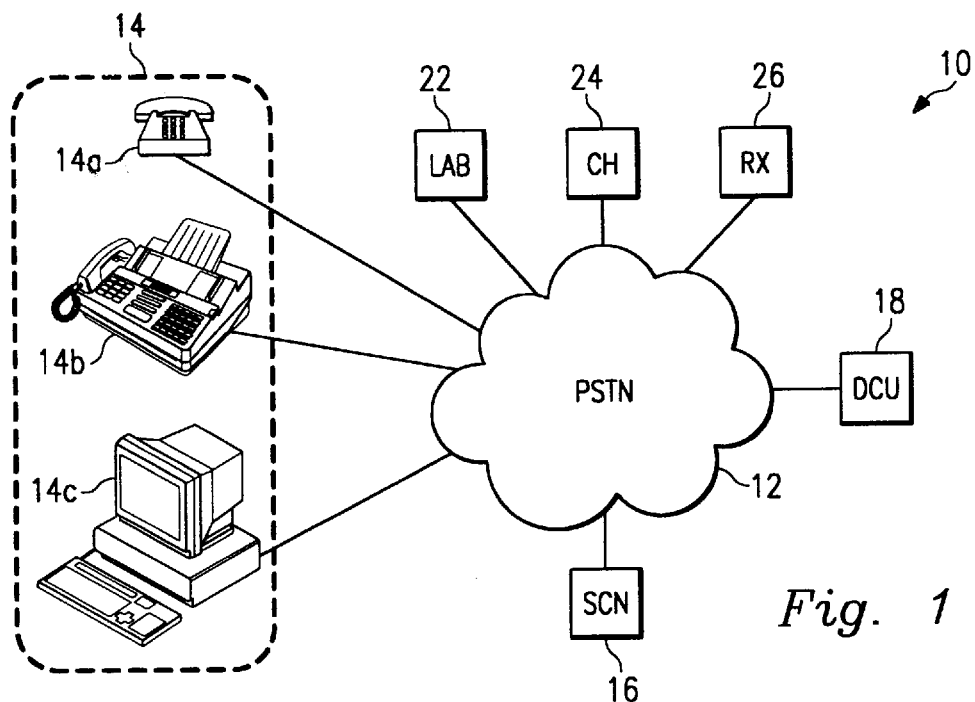
FIG. 1 provides a block diagram of a communication network employing one embodiment of the present invention.

Referring to FIG. 1, the reference numeral 10 designates a communication network including a public switched telephone network ("PSTN") 12. Connected to the PSTN 12 are a user 14, a service center network ("SCN") 16, a doctor care unit ("DCU") 18, a laboratory ("lab") 22, a payment clearing house 24, and a pharmacy 26. The user may interact with the PSTN 12 through a telephone 14a, a fax machine 14b, or a personal computer ("PC") 14c. It is understood that the items, and their quantities, represent many different ways to implement the present invention.

Figure 2:
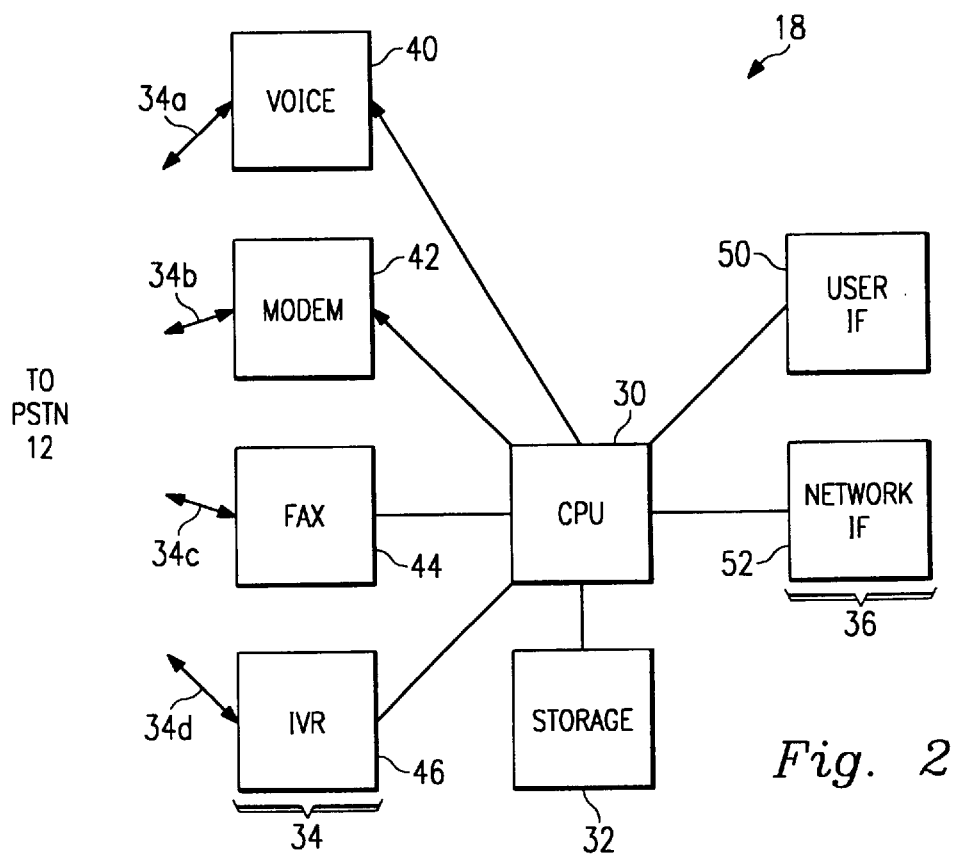
FIG. 2 provides a block diagram of a doctor care unit used in the communication network of FIG. 1.

Referring to FIG. 2, the DCU 18 includes a processor 30, a storage device 32, and two interface sections 34, 36. The interface section 34 allows the DCU 18 to communicate through the PSTN 12 and includes a voice card 40, a modem 42, a fax card 44, and an interactive voice response ("IVR") 46. The interface section 36 includes a user interface device 50, such as a keyboard and monitor, and a network interface device 52, such as an Ethernet card.

The DCU 18 is stationed at a service provider's facility, such as a doctor's office. Many hardware components are those of a conventional personal computer. Furthermore, it is understood that several components that are separately illustrated may alternatively be performed by a single component. For example, the interface section 34 is connected to the PSTN 12 through four conventional phone lines 34a, 34b, 34c, 34d. However, a single component may perform many different functions, such as a fax/modem device, and thereby allow fewer phone lines. Furthermore, a single phone line may be multiplexed to each component of the interface section 34. Further still, the modem 42 may be used to support remote access by the doctor to the DCU 18, such as through a wide area network (not shown).

The user interface device 50 may be used directly by individuals at the doctor's office, but it is preferred that the DCU 18 operate as a server, accessible through the network interface device 52.

Figure 3:
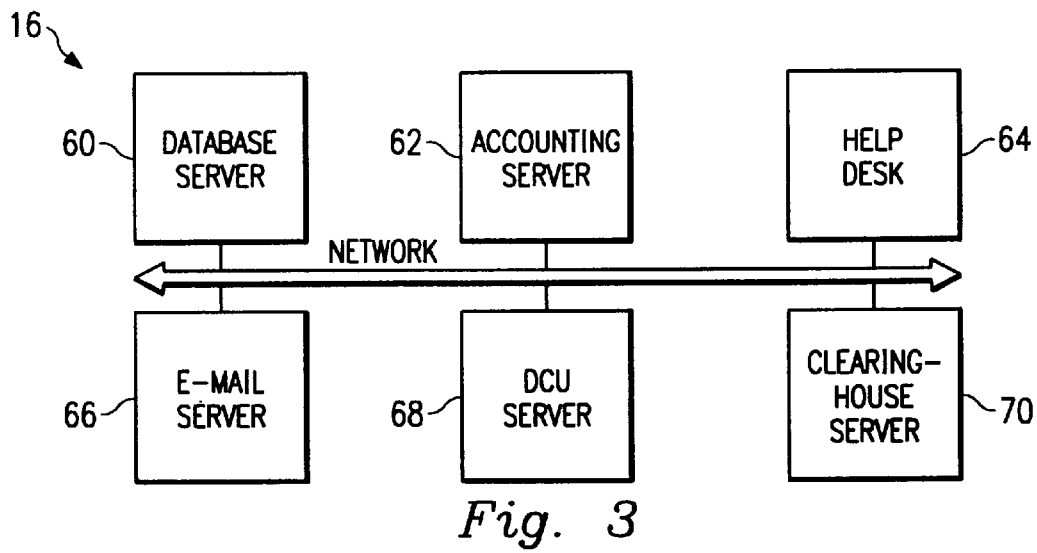
FIG. 3 provides a block diagram of a service care network used in the communication network of FIG. 1.
Figure 4A:
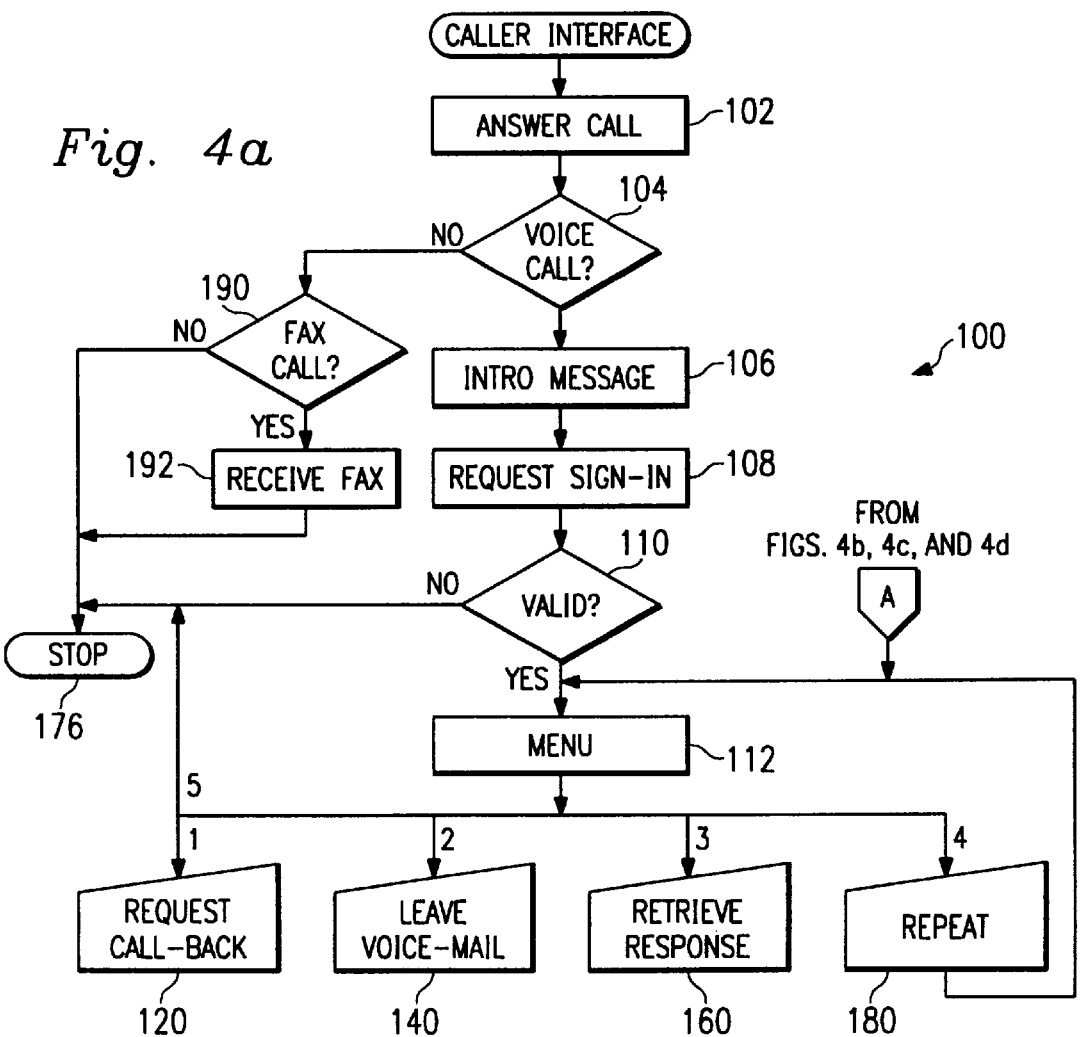
FIGS. 4a–4d are a flowchart of a caller interface routine performed by the doctor care unit of FIG. 2.
Figure 4B:
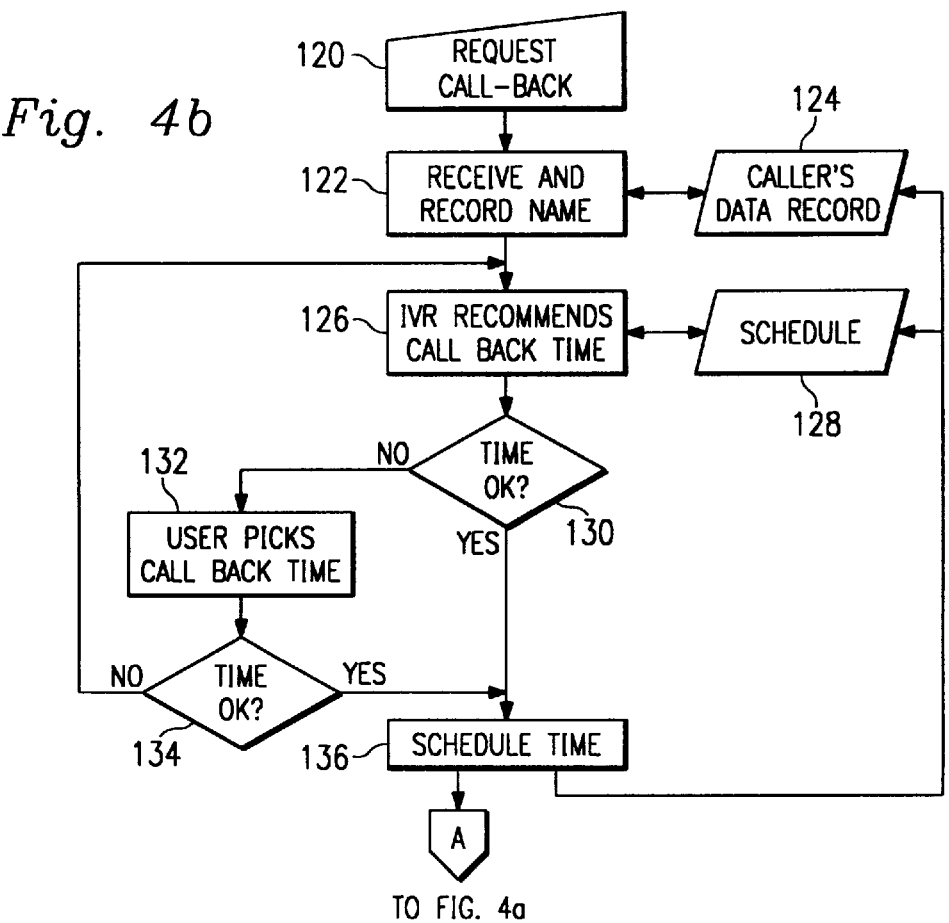
Figure 4C:
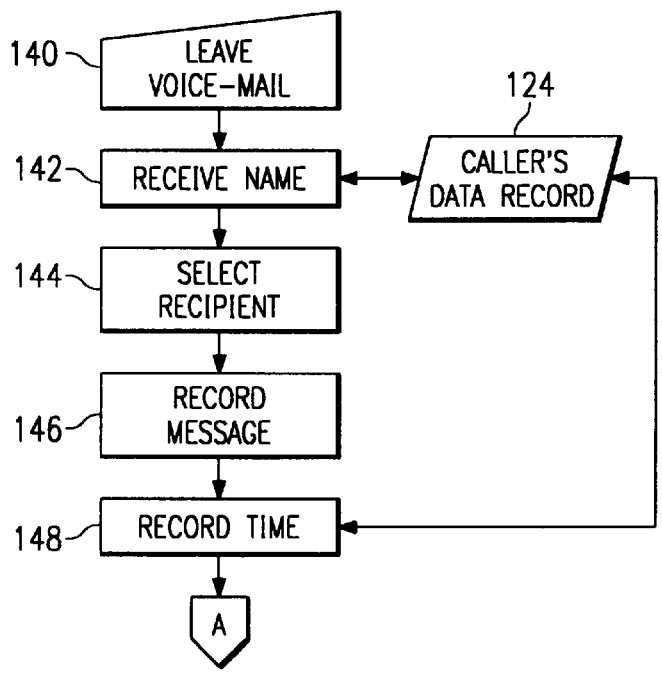
Figure 4D:
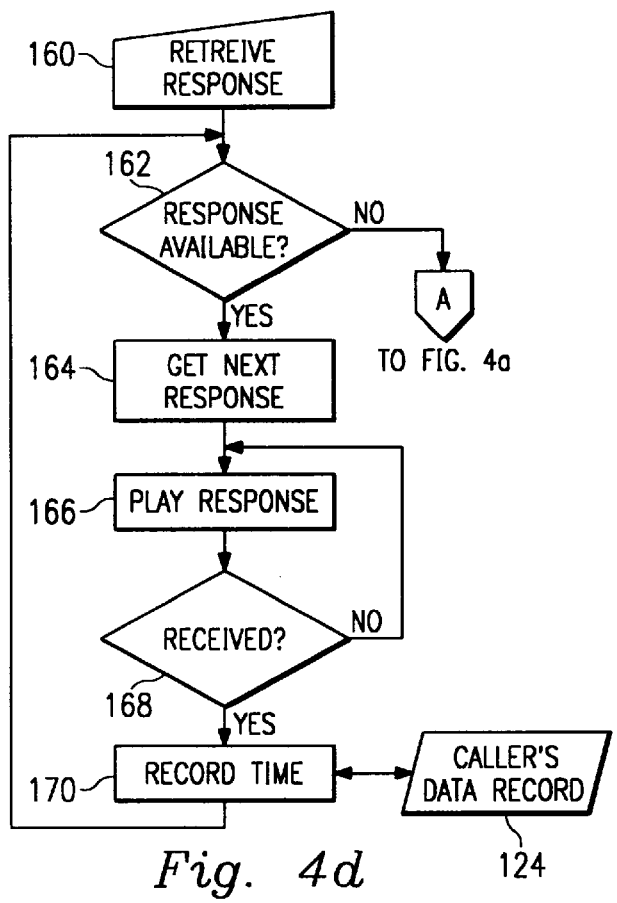

Referring to FIG. 3, the SCN 16 provides a network of servers, including a database server 60, an accounting server 62, a help desk computer 64, an e-mail server 66, a DCU server 68 and a clearing house server 70. The database server

60 contains information that is useful to the doctor's office, such as phone numbers and locations of the pharmacy 26 and lab 22 (FIG. 1). The accounting server 62 provides account information for the doctor's office itself, as well as the patients of the doctor's office. The help desk computer 64 allows the SCN 16 to access information from other servers and answer questions from different individuals. The e-mail server 66 can be used to allow internet access to the SCN 16. Although not shown, the present invention may also utilize a web site to answer questions and facilitate certain functions.

The DCU server 68 supports communication between the DCU 18 and the SCN 16. In the preferred embodiment, the DCU server 68 supports communication with many different DCU's, and may facilitate different communication protocols, as required, from the different DCU's. The DCU server 68 may initiate calls to the DCU 18, or may receive calls from the DCU. The clearing house server 70 supports communication between the clearing house 24 and the SCN 16. In the preferred embodiment, the clearing house 24 is a financial institution such as a bank, credit card company, or insurance company. Alternatively, the doctor himself may provide his own payment options and therefore act as his own clearing house, or the clearing house 24 can verify or facilitate payments by and between the doctor's office and the patients.

It is understood that different combinations of the above-described servers may be produced to perform different or additional functionality. For example, the functions of several servers may be combined into one, the e-mail server functionality may be left off, or a fax server may be added.

With the above described communication network 10, many different functions are now possible. For the sake of example, a doctor using the DCU 18 may make information available for the user 14 to access. Also, the doctor may establish a voice communication path through the DCU 18 to the user 14 to have a telephone interview while the DCU performs certain services, including interactively providing information to the doctor that is specific to the user, interactively providing information from the lab 22 or pharmacy 26, and/or recording the length of the telephone interview in order to later charge the interview to the user or the clearing house 24. The routines described below illustrate some of these functionalities, it being understood that other functions are readily apparent from the above and following descriptions.

Referring to FIGS. 4a–4d, a caller interface routine 100 is performed by the DCU 18 to interact with the user 14. In the present example, the user 14 represents a patient to a doctor's office in which the DCU 18 is located. Sample prompts shown in italics, one or more of which may be used by the routine 100, are also provided to better illustrate the functionality of the routine. The user 14 initiates the routine by placing a call to the DCU 18 through the PSTN 12. At step 102, the DCU 18 answers the call. At step 104, a determination is made as to the type of call.

*If you would like to proceed with a Telephone Visit, press [1]; if you would like to send a FAX, press [2]; to hear these choices again press [3].*

If the call is a voice call, execution proceeds to step 106 where an introduction voice message is provided to the user 14.

*Thank you for calling Dr. Black.'s office for a Telephone Visit. If you wish to schedule a regular office visit or if this is a medical emergency hang up and dial our main office number 555-1234 or 911.*

At step 108, the user 14 is requested to sign-in.

*Please enter the patient's 9 digit Social Security number.*

At step 110 a determination is made as to whether or not the user 14 is an authorized user. If the user 14 is not authorized, the routine 100 may instruct the user on how to become authorized, may give the user a second chance to sign in, or may simply terminate the call.

*Our system shows that your Credit Card is not valid as registered. Call our main office number 555-1234 during business hours. If you feel your urgent medical problem can not wait until the office opens, call another physician, dial 911, or go to the nearest hospital emergency room.*

If at step 110 it is determined that the user 14 is authorized, execution proceeds to step 112 in which a menu of options is provided to the user.

*To schedule a time for someone to call you back Press [1]; to leave a voice mail message now Press [2]; to retrieve a response from someone in the office, Press [3]; to hear these choices again please press [4]; to end this call, hang up.*

The user 14 is instructed that to select an option, he may press a corresponding key on his telephone. The options are described below in Table 1. In response to the user selection, the routine performs additional steps, also described below.

TABLE 1

| Key | Option |
|---|---|
| 1 | the user 14 wishes to have a doctor call him back. |
| 2 | the user 14 wishes to leave a voice mail for a doctor or nurse. |
| 3 | the user 14 wishes to retrieve a response to a previous voice mail or other question. |
| 4 | the user 14 wishes to hear the options again. |
| 5 | the user 14 is ready to terminate the phone call. |

If the user 14 presses the number "1" on his telephone, indicating that he wishes to have a doctor call him back, execution proceeds to step 120.

*To schedule a call back appointment with Dr. Black press [1], to schedule a call back appointment with a nurse or a physician assistant press [2].*

At step 122, the user 14 is prompted to speak his name.

*Say your complete name after the tone, and if you are calling for someone else also say the Patient's Name.*

The user's name is then stored in a user data record 124. At step 126, a schedule 128 is queried to determine when the doctor is available to make the call-back. The doctor initializes the schedule 128 by establishing a block of time in which he will perform patient call-backs, e.g., from 2:00 pm till 3:00 pm. Therefore, a potential call-back time, e.g., 2:30 pm, is retrieved and offered to the user 14.

*The next available call back appointment is Tuesday, June 26 at 2:30 PM. If this is OK press [1], if not OK press [2].*

At step 130, the user 14 is prompted to respond if the potential call-back time is acceptable. If the call-back time is not acceptable, execution proceeds to step 132 where the user is allowed to suggest another call-back time.

*Please enter a time when you can receive a call back. Enter the hour and the minute. Press [1] for AM and [2] for PM.*

At step 134 a determination is made as to whether the user-requested call-back time is acceptable to the schedule 128. If not, execution returns to step 126.

*A call back Appointment is not available at your requested time. We have appointments available on Wednesday,*

June 27 or you may leave a voice mail about your medical concern.

In this way, the user 14 and the DCU 18 "ping-pong" back and forth until a final schedule time is selected. In addition, additional control software can limit the amount of ping-ponging or simply force the user 14 to leave a voice message.

If at step 130 or step 134 an acceptable call-back time is determined, execution proceeds to step 136 where the time is stored in the user data record 124 and the schedule 128 is updated.

You have scheduled a call-back appointment with Dr. Black at approximately 2:30 PM at 555-5678.

Execution then returns to step 112.

If the user 14 at step 112 presses the number "2" on his telephone, indicating that he wishes to leave a voice mail for a doctor or nurse, execution proceeds to step 140. At step 142, the user 14 is prompted to speak his name. The user's name is then stored in the user data record 124. At step 144, the user 14 is provided with the potential recipients for the voice mail and is prompted to select one recipient.

To leave a message for Dr. Black press [1], to leave a message for a nurse or physician assistant press [2].

At step 146 the user 14 is directed into the recipient's voice mailbox (storage device 32) to record a voice message.

Begin your message after the tone. If you are requesting a prescription, leave the name and phone number of your pharmacy. When finished press the # key in the lower right corner of your phone key pad.

Also provided to the recipient's voice mailbox is the user's sign-in retrieved at step 108 as well as the time and date of the message. At step 148, the length of time of the voice message is stored in the user data record 124.

The time used to leave your message was 3 minutes 45 seconds.

Execution then returns to step 112.

If the user 14 at step 112 presses the number "3" on his telephone, indicating that he wishes to retrieve a response to a previous voice mail or other question, execution proceeds to step 160. At step 162, a determination is made as to whether any voice mail responses are available for the user 14.

You have two responses to review.

Such determination can be made through various methods, such as perusing all the potential voice mail responses to see if any are directed to the user sign-in as provided at step 108, above. If a voice mail response is available, execution proceeds to step 164 where the next voice mail response is retrieved. At step 166, the voice mail response is played to the user 14. At step 168, the user is prompted as to whether he would like to hear the voice mail response again.

If you understand the response press [1]. To hear the response again press [3].

If so, execution returns to step 166, if not, execution proceeds to step 170, where the length of time of the voice mail responses are stored in the user data record 124.

The time used to listen to your message and leave a response was 4 minutes 20 seconds.

If at step 162 a determination is made that there are no voice mail responses available, execution returns to step 112.

If at step 112 the user 14 presses the number "4" on his telephone, indicating that he wishes to hear the options again, execution returns to step 112. If the user 14 presses the number "5" on his telephone, indicating that he is ready to terminate the phone call, execution proceeds to step 176 in which the routine 100 stops.

The routine 100 can easily support different types of calls. For example, if at step 104 it is determined that the call was not a voice call, execution proceeds to step 190 where a determination is made as to whether the call is a fax. If so, execution proceeds to step 192 in which the fax is received. Also, certain flexibility can be provided at this step. For example, the user 14 will not be charged for replaying a single voice mail response, and the doctor or nurse may indicate that the voice mail response is free, i.e., no time should be recorded or charged.

Figure 5:
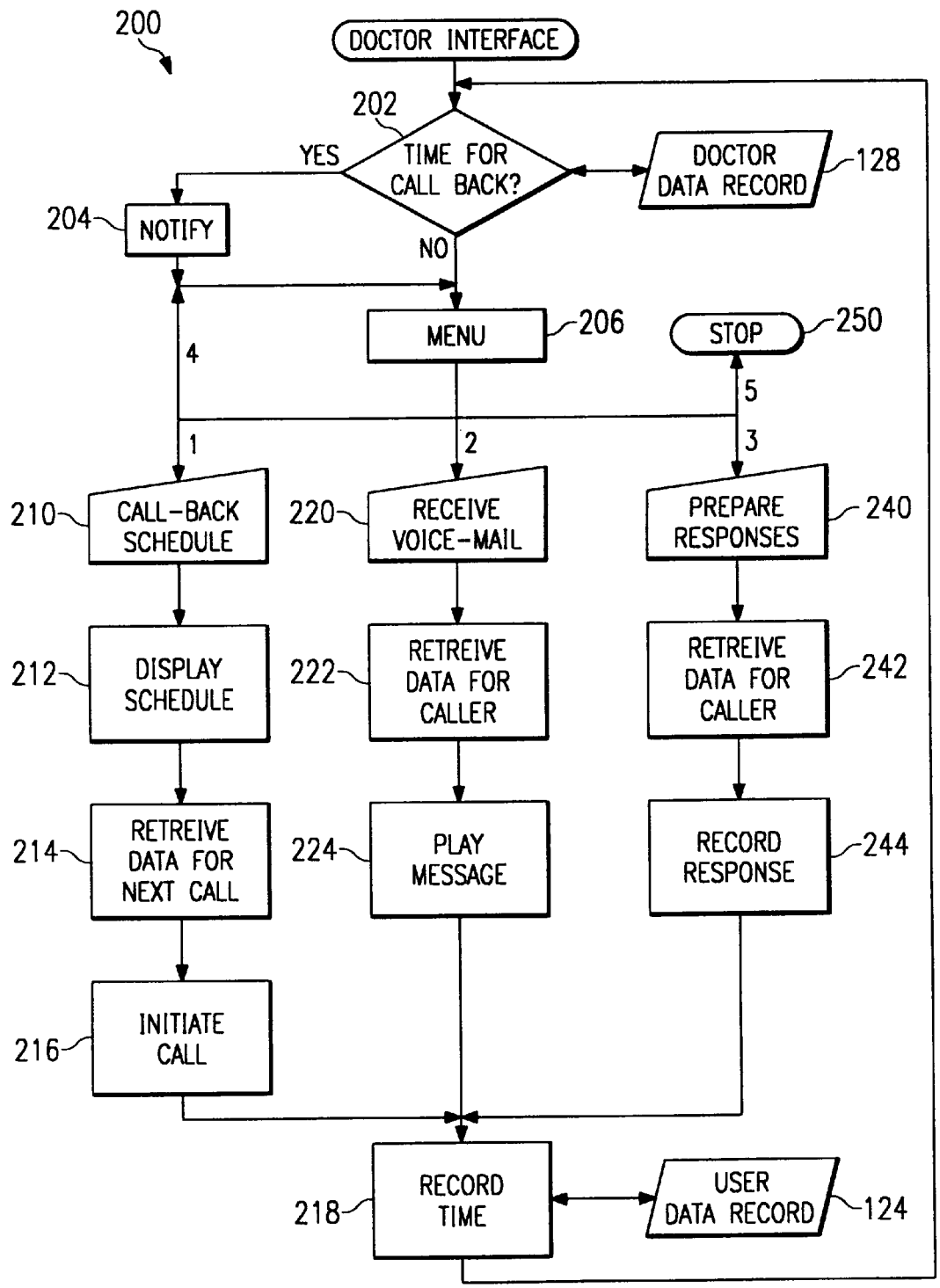
FIG. 5 is a flowchart of a doctor interface routine performed by the doctor care unit of FIG. 2.

Referring to FIG. 5, a doctor interface routine 200 is performed by the DCU 18 to interact with the service provider (doctor). The doctor may interact with the DCU 18 directly through the user interface 50 (FIG. 2) or indirectly through the network interface 52, modem 42, IVR 46, or other means. Although not shown, a log-in procedure may be provided so that unauthorized users can not access any privileged information, so that the doctor may be identified from others capable of accessing the information, and/or to support remote log-ins.

At step 202, the schedule 128 is queried to find all of the interactions that are available to the doctor. For example, the doctor may be scheduled to call back the user 14. If such interaction is required, step 204 so notifies the doctor. Execution then proceeds to step 206 in which a menu of options is provided to the doctor. For the case in which the doctor is interacting with the DCU through another computer (not shown), the notification (step 204 and menu (step 206) may be displayed as a graphical user interface ("GUI"). The menu options are described below in Table 2. In response to the doctor selection, the routine 200 performs additional steps, as described below.

TABLE 2

| Key | Option |
|---|---|
| 1 | the doctor wishes to call back one or more users. |
| 2 | the doctor wishes to receive a voice mail. |
| 3 | the doctor wishes to provide a response to a voice mail or other inquiry. |
| 4 | the doctor wishes to hear the options again. |
| 5 | the doctor is ready to terminate the routine. |

If the doctor selects key "1", indicating that he wishes to call back one or more users, execution proceeds to step 210. At step 212, the schedule 128 (FIG. 4*a*), indicating the calls the doctor needs to return, is provided. The schedule may be displayed on a computer monitor connected to the DCU 18, may be faxed to the doctor through the fax 44, or provided to the doctor in some other manner.

Figure 6:
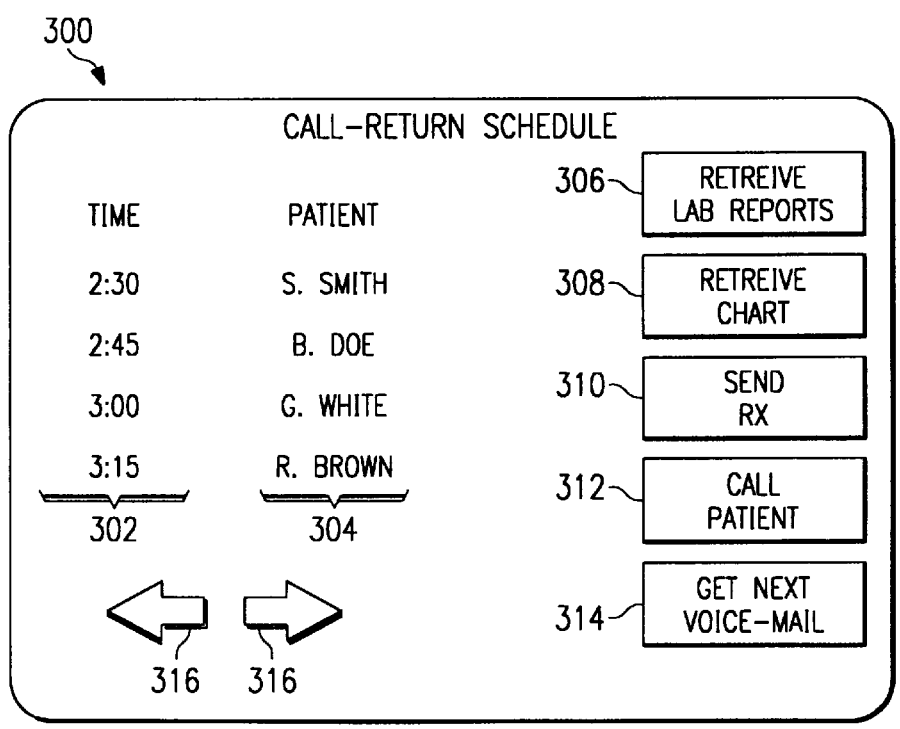
FIG. 6 is a sample display provided by the doctor interface routine of FIG. 5.

Referring to FIG. 6, a GUI screen 300, which may be displayed on the computer monitor connected to the DCU 18, is one example of how the schedule 128 may be provided to the doctor. The screen 300 provides a list of times 302 and patients 304 that the doctor is scheduled to call. Buttons 306, 308, 310, 312, and 314 allow the doctor, for a specific patient to retrieve a report from the lab 22, retrieve a medical chart updated by a nurse, another doctor, or the doctor himself, send a prescription to the pharmacy 26, call the patient, and get the patient's next voice mail, respectively. For example, a patient is first selected, such as patient S. Smith, and then by selecting the button 306, the doctor may review a lab report for S. Smith. The DCU 18 either had previously received the lab report, or in response to the button 306 being pressed, contacts the lab 22 to retrieve the lab report. The manner in which the lab report is provided to the doctor depends on the ability of the lab 22 and the DCU 18. For example, the lab 22 can simply fax the lab report to the doctor, who can then review it manually or scan it into his computer. Alternatively, the lab report can be electronically transferred directly to the DCU 18, and would thereby be immediately accessible on the computer monitor. In addition, the doctor may consult another service provider such as the clearing house 24, the pharmacy 26, or another doctor. Such consultations may also be billed to the caller's data record 124 at a predetermined rate.

Referring to both FIGS. 5 and 6, at step 214, data is retrieved for the patient whom the doctor will be calling. The button 308 allows the doctor to retrieve the patients medical history. The button 310 allows the doctor to automatically send prescriptions to the pharmacy 26. The button 312 allows the doctor to retrieve personal data of the patient, such as phone number, emergency contacts, etc. The button 314 allows the doctor to retrieve the next voice mail left by the particular patient. Buttons 316 provide backward and forward menu functions representing typical GUI operations. At step 216, the doctor calls the patient. If the doctor's computer has a built-in telephone, the button 312 may further allow the DCU 18 to dial the patient directly so that the call back can be provided through the doctor's computer. Alternatively, a conventional telephone (not shown) may be connected to the computer so that the computer can track the call time. Upon completion of the call, at step 218, the time of the call is recorded in the user data record 124. Execution then returns to step 202.

Referring again to FIG. 5, if at the menu step 206 the doctor selects key "2," indicating that he wishes to receive a voice mail, execution proceeds to step 220. At step 222, the next voice mail message is retrieved from the storage device 32. At step 224, the voice mail message is played back to the doctor. It is understood that a schedule, similar to the screen 300 described above, may also be provided with this option. As a result, the doctor may retrieve data about the patient who has left the voice mail message. Upon receipt of the voice mail message, execution proceeds to step 218. Since the length of the voice mail message was already stored and billed when the message was recorded (step 148, FIG. 4), it is not necessary to record the length again. However, it may be desired to not store and bill the message until the doctor actually has listened to it, i.e., to not execute step 148. Design flexibility is thereby provided for doctor customization.

In addition, different types of messages may be provided along with the voice mail messages. For example, hearing impaired patients may provide fax messages or e-mail messages for the doctor. Alternative billing arrangements may be determined for such messages, such as on a per-page or per-line basis. It is understood that many different communication methods may be equally applied, such methods being well understood and easily adapted to the present invention by one of ordinary skill in the art.

If at the menu step 206 the doctor selects key "3," indicating that he wishes to provide a response to a voice mail or other inquiry, execution proceeds to step 240. At step 242, data is retrieved relating to the call and/or patient. If the doctor is replying to a voice mail message, as discussed above, he may already have patient data available. However, if the doctor is replying to a fax or other type of message, this step provides the necessary data to support his response. At step 244 the doctor records his response in the storage device 32. As a result, the response is now available for later retrieval by the patient. Execution then proceeds to step 218 where the time of the doctors response is recorded in the user data record 124.

If at the menu step 206 the doctor selects key "4," indicating that he wishes to hear the options again, execution returns to step 206. If the doctor selects key "5," indicating that he is ready to terminate the doctor interface routine 200, execution proceeds to step 250 in which the routine stops.

Although not shown, the doctor interface routine 200 may support many additional functions. For example, it may allow the doctor to adjust or credit the number of minutes that will eventually be billed to a patient. It may support additional types of access to the patient information, such as internet access or pager access. It may offer different functions, or billing rates, for different doctors and/or office staff. For example, it may allow the doctor to charge for a consultation with a specialist, at a predetermined rate, to be added to the user data record 124. Furthermore, it may allow the doctor to interface directly with the pharmacy 26 for setting or checking on prescriptions, with the clearing house 24 for direct billing, or with the lab 22 for consultation and other inquiries.

Referring again to FIG. 3, on a periodic basis, the SCN 16 contacts the DCU 18. Various functions can thereby be performed. For one, the DCU server 68 can retrieve the user data record 124 (FIG. 4). The accounting server 62 may then calculate a bill according to the data in the user data record. For example, if the user 14 has compiled three telephone calls to the doctor, each lasting five minutes, and the billing rate for the user is five dollars per minute, the accounting server 62 may then calculate a bill for $75 to be sent to the user. In the preferred embodiment, the user 14 will have already established a method of payment, such as through a credit card of the clearing house 24, so that the accounting server 62 may provide the bill directly to the clearing house server 70. The clearing house server 70 may then contact the clearing house 24 for payment. Once payment has been received, the payment can then be provided to the doctor in various manners, including electronic transfer or through a draft check. In the preferred embodiment, an agreement will have been established with the doctor and the SCN 16 so that a portion of the payment can be withheld by the SCN to pay for operating costs.

Another function to be performed by the SCN 16 is to update the doctor's information. For example, the database server 60 may maintain a current list of pharmacies, including telephone and insurance information for each pharmacy. In this way, the SCN 16 can download this information to the DCU 18 so that the doctor will also have correct pharmacy information.

It is understood that the information providers described above, as well as the scenarios associated therewith, are merely representative of many different applications. For example, functions performed through the PSTN 12 may alternatively be performed through the internet, a wireless network, or other communication network. Therefore, although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A service provider interactive unit comprising:
an automated client interactive unit for communicating with a client of a service provider and providing the client a plurality of client functions including at least one from the group consisting of: request a call back interview, leave a voicemail for a service provider, retrieve a recorded response from the service provider, receive a fax and receive an e-mail message;
a service provider interface for communicating with the service provider and providing the service provider with a plurality of service provider functions including at least one from the group consisting of: a call back interview schedule, and playing voicemails from a client, and at least one medical function from the group consisting of: preparing responses for the client, retrieving client information, sending a prescription to a pharmacy and receiving a report from a lab;

a central processor connected between the automated client interactive unit and the service provider interface, wherein the central processor creates a record of use and an associated billing rate for at least one of the group consisting of: the automated client interactive unit and the service provider interface; and a storage device connected to the central processor for storing the record of use.

2. The service provider interactive unit of claim 1 wherein the record of use is used to bill the client.

3. The service provider interactive unit of claim 1 wherein the automated client interface unit includes an interactive voice response unit.

4. The service provider interactive unit of claim 1 wherein the plurality of client functions includes at least two from the group consisting of: request a call back interview, leave a voicemail for a service provider, retrieve a recorded response from the service provider, receive a fax and receive an e-mail message.

5. The service provider interactive unit of claim 1 wherein the plurality of service provider functions includes at least two medical functions from the group consisting of: preparing responses for the client, retrieving client information, sending a prescription to a pharmacy and receiving a report from a lab.

6. The service provider interactive unit of claim 1 further comprising:

a means for contacting a second service provider.

7. The service provider interactive unit of claim 6 wherein the service provider is a doctor's office and the second service provider is selected from the group consisting of: a clearing house, a laboratory, and a pharmacy.

8. An apparatus for scheduling call-back appointments between a client and a service provider, the apparatus comprising:

an interactive response unit for scheduling the client with the service provider by the client accepting a call-back appointment provided by one of either the interactive response unit or the client;

a storage device for storing a schedule of the service provider;

an authentication device that validates the client before scheduling the client with the service provider;

a processing device for analyzing the schedule to determine potential appointments, for receiving an accepted appointment from the client, for recording the accepted appointment in the schedule, for creating records of use and an associated billing rate; and a means for providing the service provider a plurality of telephonic functions including at least one from the group of: calling the client, and retrieving the next voice-mail, and a plurality of medical functions including at least one from the group consisting of: retrieving lab reports for the client, retrieving charts for the client, and sending a prescription to a pharmacy.

9. The apparatus of claim 8 further comprising:

means for notifying the service provider of the accepted appointment.

10. The apparatus of claim 9 wherein the storage device also contains information about the client and the means for notifying supplies the information to the service provider for the accepted call-back appointment.

11. The apparatus of claim 8 further comprising:

a voice mail system so that the client may leave a voice mail message for the service provider.

12. The apparatus of claim 11 wherein the voice mail system also allows the service provider to leave a message for the client and wherein the interactive voice response unit allows the client to retrieve the service provider's message.

13. The apparatus of claim 8 further comprising:

a time measurement device that records a length of time the service provider spent on the accepted appointment.

14. The apparatus of claim 13 wherein the appointment was for a telephone conference and the time spent includes the length of the telephone conference.

15. The apparatus of claim 13 wherein the appointment was for a reply message, the interactive voice response unit allows the client to retrieve the reply message, and the time spent includes a length of the reply message and a length of time the service provider spent on listening to an incoming message from the client.

16. The apparatus of claim 13 further comprising:

a billing system for retrieving the length of time and creating a bill in response to the retrieved length of time.

17. The apparatus of claim 16 wherein the billing system is remote from the time measurement device.

18. An apparatus for supporting call-back telephone conferences between a client and service provider where the client schedules the call-back conference with the service provider, the apparatus comprising:

an interactive response unit for providing a call-back telephone conference appointment for a client and a service provider by the client choosing a time corresponding to an available call-back time of the service provider;

a time measurement device that records a length of time of the call-back telephone conference;

a billing system, remote from the time measurement device, for retrieving the length of time of the call-back telephone conference, a billing rate associated with the service provider and creating a bill in response thereto; and a means for providing the service provider a plurality of telephonic functions including at least one from the group of: calling the client, and retrieving the next voice-mail, and a plurality of medical functions including at least one from the group consisting of: retrieving lab reports for the client, retrieving charts for the client, and sending a prescription to a pharmacy.

19. A method for supporting communication between a service provider and a client, the method comprising the steps of:

storing a schedule of available call-back appointments for the service provider;

receiving confirmation from the client for one of the available call-back appointments;

notifying the service provider of the confirmed appointment;

providing information about the client to the service provider to facilitate the call-back appointment;

recording the actual length of time for the call-back appointment and an associated billing rate; and providing the service provider a plurality of telephonic functions including at least one from the group of:

calling the client, and retrieving the next voice-mail, and a plurality of medical functions including at least one from the group consisting of: retrieving lab reports for the client, retrieving charts for the client, and sending a prescription to a pharmacy.

20. A method for supporting communication between a service provider and a client, the method comprising the steps of:

storing a schedule of available appointments for the service provider;

receiving confirmation from the client for one of the available appointments;

notifying the service provider of the confirmed appointment;

providing information about the client to the service provider to facilitate the appointment;

recording the actual length of time for the appointment and an associated billing rate; and providing the service provider a plurality of telephonic functions including at least one from the group of: calling the client, and retrieving the next voice-mail, and a plurality of medical functions including at least one from the group consisting of: retrieving lab reports for the client, retrieving charts for the client, and sending a prescription to a pharmacy.

21. The method of claim 19 further comprising:

calculating a bill for the client according to the recorded length of time; and requesting payment for the bill from a clearing house.

22. The method of claim 21 wherein the client has established payment authorization between the service provider and the clearing house.

23. The method of claim 19 wherein the schedule further includes non-telephonic appointments.

24. The method of claim 19 further including validating the client before scheduling a call-back appointment.

25. The method of claim 19 wherein the service provider is a doctor and the client is a patient.

* * * * *